United States Patent [19]

Loy

[11] Patent Number: 4,621,902
[45] Date of Patent: Nov. 11, 1986

[54] DEVICE FOR PROJECTING THE IMAGE OF A RETICLE IN AN OPTICAL SYSTEM

[75] Inventor: Fernand R. Loy, Sceaux, France

[73] Assignee: U.S. Philips Corporation, New York, N.Y.

[21] Appl. No.: 675,493

[22] Filed: Nov. 28, 1984

[30] Foreign Application Priority Data

Dec. 23, 1983 [FR] France ................................ 8320692

[51] Int. Cl.[4] ............................................. G02B 21/36
[52] U.S. Cl. .................................................... 350/576
[58] Field of Search ............... 356/254, 255, 251, 252; 350/562, 565, 566, 576, 174; 351/212, 214

[56] References Cited

U.S. PATENT DOCUMENTS 2,725,781  12/1955  Banker ................................ 356/251
3,936,137   2/1976  Litman ................................ 356/252

Primary Examiner—John K. Corbin
Assistant Examiner—Vincent J. Lemmo
Attorney, Agent, or Firm—Marc D. Schechter

[57] ABSTRACT

A device for projecting the image of a reticle in an optical system whose line of sight is represented by the reticle. The collimator is situated at the edge of the pupil of an objective of the optical system. The optical axes of the objective coincides with the line of sight. According to the invention, the collimator comprises two subcollimators arranged along respective orthogonal axes perpendicular to the optical axis. Each collimator forms an image of a radial slit in such a way that the intersection of the two slit images is situated on the line of sight. In this way, focussing error does not give rise to an angular displacement of the line of sight.

4 Claims, 6 Drawing Figures

DEVICE FOR PROJECTING THE IMAGE OF A RETICLE IN AN OPTICAL SYSTEM

BACKGROUND OF THE INVENTION

The invention relates to a device for projecting the image of a reticle in an optical system. The line of sight of the optical system is represented by the reticle.

The reticle-projecting device comprises a collimator situated at the edge of the pupil of an objective of the optical system. The objective has an optical axis which coincides with the line of sight.

The invention is employed mainly, though not exclusively, in thermal imagers used for aiming guns or missiles. In such applications, the line of sight should be brought into line with the weapon system. The firing precision depends on the accuracy of this alignment, which should be maintained under the conditions in a military environment.

There are several methods of forming a reticle. One of these methods is to arrange a collimator in front of the thermal camera. The collimator projects an image of a reticle into the camera, and the image is superimposed on the image of the scene. In this case the stability of the line of sight depends only on the collimator. This is important because it is much easier to ensure a stable arrangement of a collimator of small dimensions than that of a thermal camera, which is a complex optical apparatus comprising bulky optical systems.

The collimator must be situated in the center of the pupil of the thermal camera. For any other arrangement of the collimator, for example at the edge of the pupil, a focussing error will lead to an angular displacement of the line of sight.

This arrangement of the collimator in the center of the pupil of the camera is not always possible because of the available space or the mechanical connection. If the camera is equipped with a zoom or multifocus objective, arrangement of the collimator at the center of the pupil will block the entire scene when the diameter of the pupil decreases for short focal lengths.

SUMMARY OF THE INVENTION

It is an object of the invention to provide a device in which the collimator is arranged near the edge of the pupil, without the direction of the line of sight being dependent on the focussing of the objective of the camera or any other optical system.

According to the invention the collimator comprises two subcollimators. The subcollimators are arranged along mutually orthogonal axes and perpendicular to the optical axis. A first subcollimator forms the image of a first radial slit and a second subcollimator, which is identical to the first subcollimator, forms the image of a second radial slit which is perpendicular to the first image. The images of the slits are formed such that the intersection of these images is situated in the line of sight.

The pupils of the first and second subcollimators have a rectangular shape. The long side of the rectangle extends perpendicular to the direction of the corresponding slit. For a given pupil area, this arrangement reduces diffraction effects in the image of the slit and provides distinct edges.

BRIEF DESCRIPTION OF THE DRAWING

FIG. 4a is a front view, partly schematic, of an embodiment of the invention using mirrors.

FIG. 4b is a cross-sectional view, partly schematic, of the embodiment shown in FIG. 4a.

DESCRIPTION OF THE PREFERRED EMBODIMENTS

Figure 1:
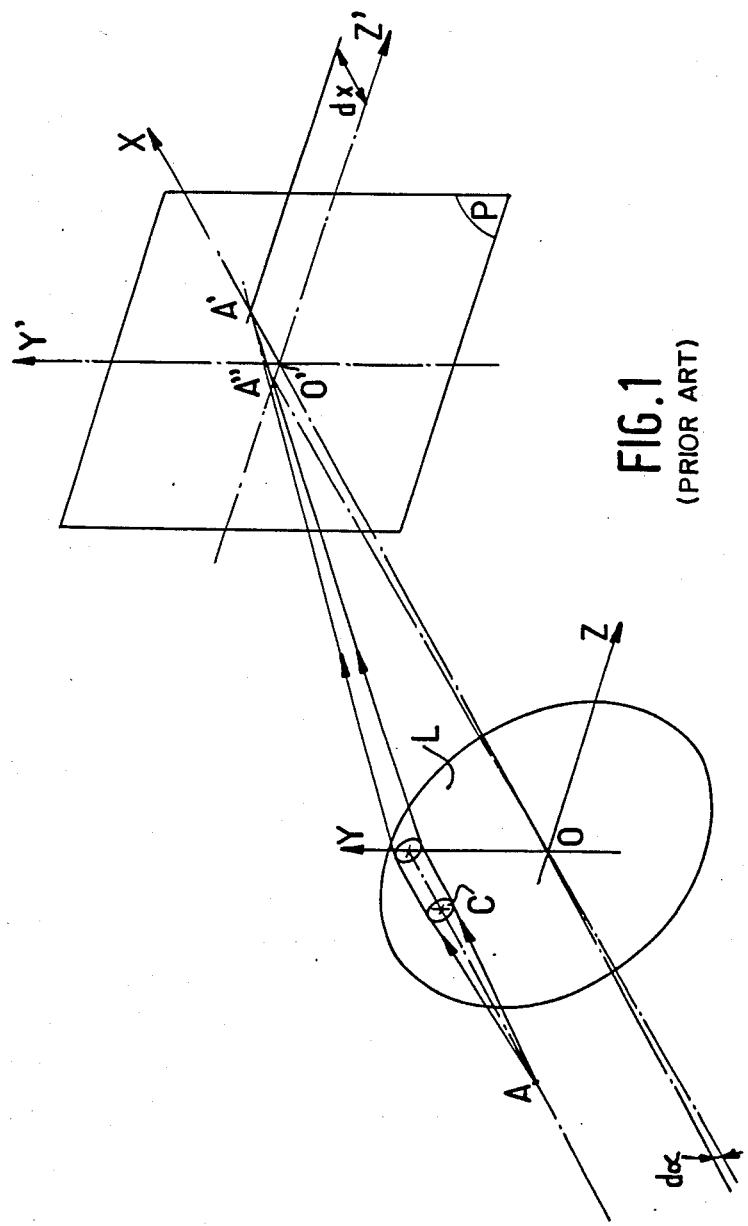
FIG. 1 is a schematically illustrates the alignment error in a prior art device caused by a focussing error when the collimator is arranged near the edge of the pupil.

In FIG. 1, the objective is a convergent lens with an optical center O and a line of sight OX.

The collimator C, and which is situated at the edge of the pupil of the objective L, forms an image A' of a point A.

If there is a focussing error, the focal plane P, through which the line of sight extends at O', is translated over a distance dx. It can be seen that the image of A is now moved to A" and that the line of sight exhibits an angular displacement $d\alpha$.

Figure 2:
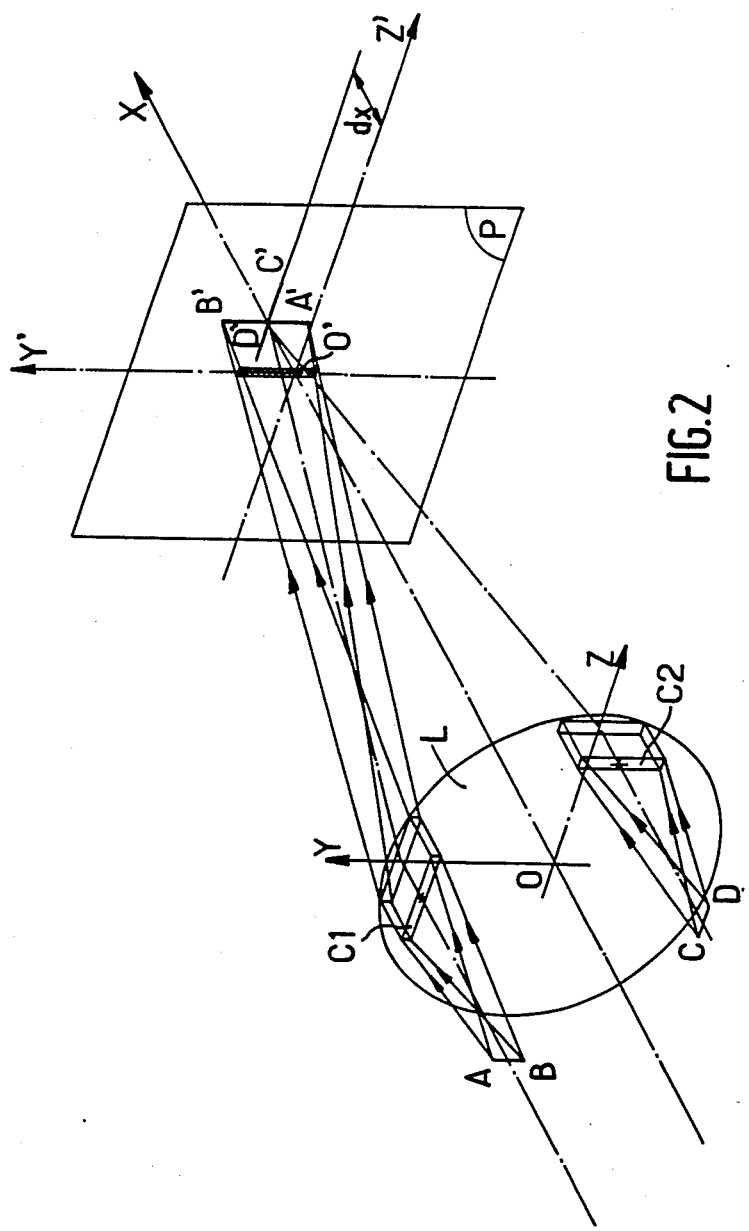
FIG. 2 schematically illustrates the principle of the device according to the invention.

In order to solve this problem the device according to the invention, shown schematically in FIG. 2, comprises two subcollimators C1 and C2. Subcollimators C1 and C2 are arranged near the edge of the pupil of the objective L on the axes OY and OZ, respectively.

The collimator C1 images a radial slit AB which extends parallel to the axis OY at A'B'. The collimator C2, which is identical to the first collimator, forms an image of a radial slit CD, which extends parallel to the axis OZ, at C'D' in such a way that the intersection of A'B' with C'D' is situated on the line of sight OX.

The rays have been traced only for the collimator C1 in order to simplify the Figure.

It is to be noted that if the focal plane P of the objective L does not contain the images A'B' and C'D' and the focussing error is dx, the intersection of the beam of C1 with the plane P is translated along the axis O'Y'. However, the crossing of the two images of the reticles remains on the axis OX.

The optical axes of the collimators C1 and C2 intersect the axes OY and OZ, respectively, at the edge of the pupil of the objective when the objective is a long-focus objective (a zoom lens or a multifocus objective). This also holds true during aiming if the objective has a short focal length, as used in the observation of a larger field, the diameter of the pupil decreases for a given numerical aperture, the collimator beam no longer enters the objective, and the reticle disappears.

In order to reduce the effect of diffraction in the slit image the pupils of the collimators C1 and C2 are made rectangular with the long side perpendicular to the direction of the slit.

Figure 3:
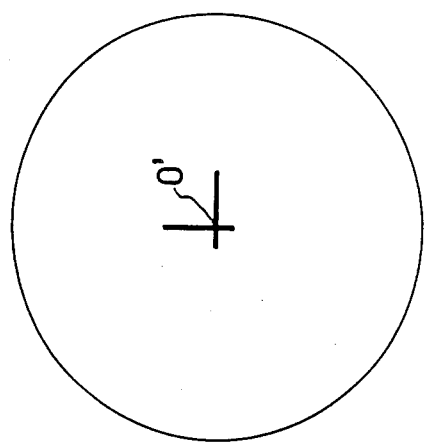
FIGS. 3a and 3b show the reticle as viewed by the thermal camera with correct focussing (FIG. 3a) and with focussing error (FIG. 3a).
Figure 3:
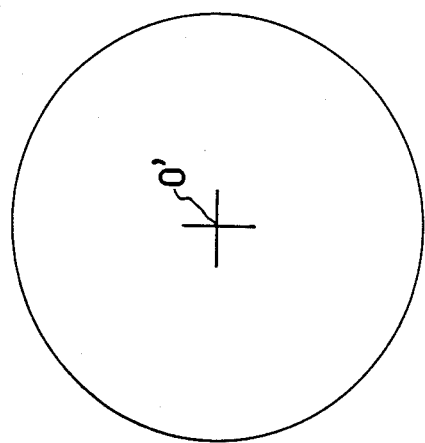

FIGS. 3a and 3b show views of the reticle with correct focussing of the objective and with a focussing error, respectively. In the latter case the two lines of the reticle are translated radially along their respective axes but their intersection at O' remains stationary.

This type of collimator is suitable for reticles having two perpendicular or nonperpendicular lines.

In practice, the collimators may be constructed in several ways using lenses or mirrors.

Figure 4:
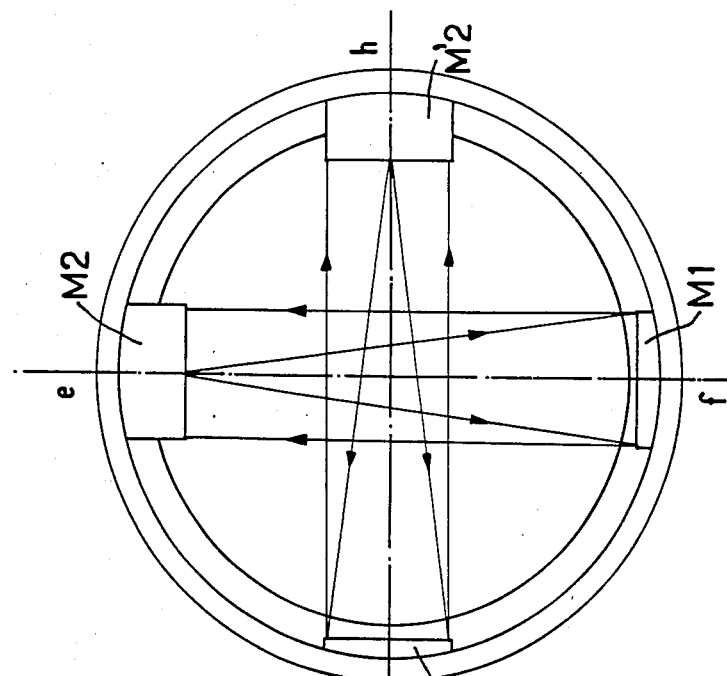
Figure 4:
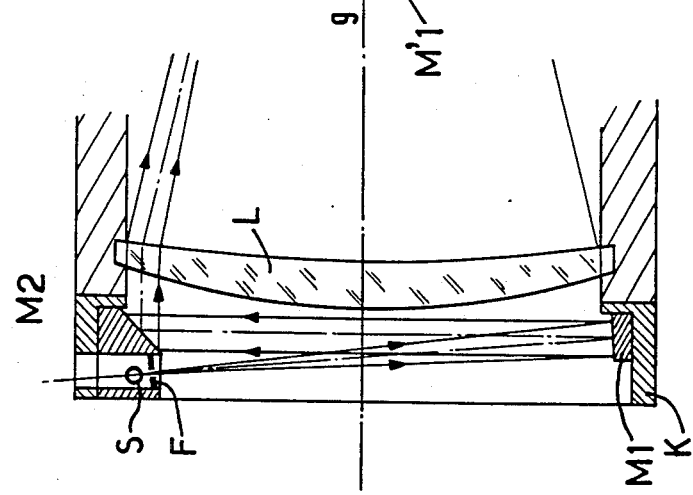

A simple and compact construction is shown schematically in FIGS. 4a and 4b. This construction employs a mirror, which has the advantage that it can be be controlled by visible light and can be used in a broad spectral region. Its characteristics are temperature-independent.

The collimator, which is disposed along the diametral line ef and whose components are all shown in the cross-sectional view in FIG. 4b, comprises a source S. Source S illuminates a slit F situated in the focus of a spherical mirror M1. This mirror reflects the beam back into the objective L of the camera by way of plane mirror M2. Mirror M2 is arranged between the slit F and the objective L, and is disposed at 45° to the direction of the line of sight.

The other collimator comprises mirrors M'1 and M'2. This second collimator is arranged at 90° relative to the first collimator along the diametral line gh. The various components of these collimators are mounted in a metal ring K arranged in front of the objective L.

This device is particularly suitable for use with a thermal camera but its principle may be applied to any optical system regardless of the wavelength.

What is claimed is:

1. A reticle projection system comprising:
    an objective lens having an optical axis and a pupil;
    a first collimator arranged at a first position at an outer edge of the pupil, the first collimator collimating light from a first slit and projecting the collimated image through the objective; and
    a second collimator arranged at a second position at the outer edge of the pupil, the second collimator collimating light from a second slit and projecting the collimated image through the objective;
    characterized in that:
    the objective forms images of the slits, the images of the slits intersecting on the optical axis;
    the image of the first slit extends radially with respect to the optical axis in the direction of the first collimator; and
    the image of the second slit extends radially with respect to the optical axis in the direction of the second collimator.

2. A reticle projection system as claimed in claim 1, characterized in that:
    the first collimator is arranged on a first axis which passes through the optical axis;
    the second collimator is arranged on a second axis which passes through the optical axis; and
    the first and second axes are perpendicular to each other and to the optical axis.

3. A reticle projection system as claimed in claim 2, characterized in that the first and second collimators have rectangular pupils with the long side of each rectangle perpendicular to the direction of the radial slit.

4. A reticle projection system as claimed in claim 3, characterized in that each collimator comprises:
    a ring arranged in front of the objective;
    a spherical mirror arranged in the ring, said mirror having a focus;
    a slit arranged in the ring at the focus of the spherical mirror;
    a light source arranged in the ring behind the slit; and
    a plane mirror arranged on the ring to reflect light from the spherical mirror onto the objective.

* * * * *